(12) United States Patent
Yang et al.

(10) Patent No.: US 12,313,789 B2
(45) Date of Patent: May 27, 2025

(54) ADAPTIVE LASER POWER AND RANGING LIMIT FOR TIME OF FLIGHT SENSOR

(71) Applicant: STMICROELECTRONICS, INC., Coppell, TX (US)

(72) Inventors: Xiaoyong Yang, San Jose, CA (US); Rui Xiao, Cupertino, CA (US); Arnaud Deleule, Cupertino, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 1160 days.

(21) Appl. No.: 17/064,398

(22) Filed: Oct. 6, 2020

(65) Prior Publication Data

US 2021/0033704 A1 Feb. 4, 2021

Related U.S. Application Data

(62) Division of application No. 15/605,611, filed on May 25, 2017, now Pat. No. 10,823,826.

(60) Provisional application No. 62/349,934, filed on Jun. 14, 2016.

(51) Int. Cl.
*G01S 7/484* (2006.01)
*G01S 7/486* (2020.01)
*G01S 17/10* (2020.01)

(52) U.S. Cl.
CPC ............ *G01S 7/484* (2013.01); *G01S 7/4868* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 4,623,237 A | 11/1986 | Kaneda et al. | |
| 5,699,149 A | 12/1997 | Kuroda et al. | |
| 6,710,859 B2 | 3/2004 | Shirai et al. | |
| 7,193,690 B2 | 3/2007 | Ossig et al. | |
| 7,508,496 B2 | 3/2009 | Mettenleiter et al. | |
| 7,969,558 B2 | 6/2011 | Hall | |
| 8,675,181 B2 | 3/2014 | Hall | |
| 8,925,814 B1 | 1/2015 | Schneider et al. | |
| 9,709,678 B2 | 7/2017 | Matsuura | |

(Continued)

FOREIGN PATENT DOCUMENTS

WO 01/50179 A1 7/2001

OTHER PUBLICATIONS

NPL1 (Laser Safety Manual) (Year: 2007).*
Laser Safety Manual, Radiation Safety Office, Environmental Health and Safety, University of Washington, 2007.

*Primary Examiner* — Isam A Alsomiri
*Assistant Examiner* — Sanjida Naser
(74) *Attorney, Agent, or Firm* — Seed IP Law Group LLP

(57) ABSTRACT

A time of flight range detection device includes a laser configured to transmit an optical pulse into an image scene, a return single-photon avalanche diode (SPAD) array, a reference SPAD array, a range detection circuit coupled to the return SPAD array and the reference SPAD array, and a laser driver circuit. The range detection circuit in operation determines a distance to an object based on signals from the return SPAD array and the reference SPAD array. The laser driver circuit in operation varies an output power level of the laser in response to the determined distance to the object.

19 Claims, 5 Drawing Sheets

(56) References Cited

U.S. PATENT DOCUMENTS

| | | | |
|---|---|---|---|
| 2002/0071126 A1* | 6/2002 | Shirai | G01S 17/931 |
| | | | 356/614 |
| 2004/0135992 A1 | 7/2004 | Munro | |
| 2007/0145136 A1 | 6/2007 | Wiklof et al. | |
| 2008/0144000 A1* | 6/2008 | Thun | G01S 17/894 |
| | | | 702/159 |
| 2009/0262760 A1* | 10/2009 | Krupkin | G01S 13/22 |
| | | | 356/28 |
| 2009/0273770 A1 | 11/2009 | Bauhahn et al. | |
| 2009/0275841 A1* | 11/2009 | Melendez | A61B 5/6887 |
| | | | 600/476 |
| 2010/0085567 A1* | 4/2010 | Dottery | G01N 21/65 |
| | | | 356/318 |
| 2010/0096459 A1 | 4/2010 | Gurevich | |
| 2010/0250189 A1 | 9/2010 | Brown | |
| 2011/0001957 A1 | 1/2011 | Braune et al. | |
| 2011/0170534 A1* | 7/2011 | York | H04J 3/0667 |
| | | | 702/89 |
| 2011/0304842 A1 | 12/2011 | Kao et al. | |
| 2012/0294422 A1 | 11/2012 | Cheung et al. | |
| 2013/0236171 A1 | 9/2013 | Saunders | |
| 2014/0077086 A1 | 3/2014 | Batkilin et al. | |
| 2014/0240317 A1 | 4/2014 | Go et al. | |
| 2016/0003944 A1 | 1/2016 | Schmidtke et al. | |
| 2016/0080709 A1* | 3/2016 | Viswanathan | G02B 26/101 |
| | | | 353/121 |
| 2017/0038459 A1 | 2/2017 | Kubacki et al. | |
| 2017/0067734 A1 | 3/2017 | Heidemann et al. | |
| 2017/0285078 A1* | 10/2017 | Saha | G01R 17/02 |
| 2017/0303789 A1 | 10/2017 | Tichauer et al. | |
| 2018/0131449 A1 | 5/2018 | Kare et al. | |

\* cited by examiner

ADAPTIVE LASER POWER AND RANGING LIMIT FOR TIME OF FLIGHT SENSOR

BACKGROUND

Technical Field

The present disclosure generally relates to time of flight range detection devices, and more particularly, to time of flight range detection devices having an adaptive laser output power.

Description of the Related Art

Ranging devices, such as time of flight (TOF) sensors, are typically used to detect the distance to nearby objects and are able to do so without physically touching the object. Conventional time of flight sensors may be used for object detection, proximity detection, and further may be used to determine an actual range or distance from the device to a detected object. Such devices may be utilized in various electronic devices, such as cameras, phones, including smartphones, vehicles, machinery, and other devices for detecting the distance to nearby objects.

Conventional TOF sensors or devices typically include a light-emitting device (e.g., a laser or a LED), a return or target sensor array, a reference sensor array, and circuitry for driving an output light emission and for processing signals received by the return and reference sensor arrays. The return and reference sensor arrays may be single-photon avalanche diode (SPAD) arrays.

Generally described, the light-emitting device emits radiation into an image scene. Some portion of the emitted radiation is reflected off of an object in the image scene and back toward the return sensor array. Another portion of the emitted radiation is reflected by an internal optical barrier, and this reflected radiation is received by the reference sensor array. The return and reference arrays generate respective electrical signals indicative of the received radiation, which is transmitted to the processing circuitry (e.g., a readout circuit) which determines the distance to the object based on a difference in time in receiving the signals from the return and reference sensor arrays.

Typically, time of flight range detection devices operate a light-emitting device having a particular, fixed output power and detection range. For example, a TOF device for detecting objects at relatively far distances may utilize a relatively high powered laser (e.g., a class 2 laser), which may not be safe for operating in a mid- or near-range. On the other hand, TOF devices for detecting objects at nearer ranges may utilize a laser having an output power that is fixed within a lower power range (e.g., a class 1 laser).

Moreover, conventional TOF devices exhibit a problem of non-linear (and inaccurate) range detection for objects that are quite close to the device. For example, detection of objects at a range of within about 15 millimeters by conventional class 1 laser operated TOF devices is challenging, as the determined range results are generally non-linear and imprecise.

BRIEF SUMMARY

The present disclosure provides devices, systems and methods for dynamically adapting an output power level of a laser in a TOF range detection device. The laser output power level may initially be set to a mid-level output power, which may be within certain prescribed safety limits (e.g., a class 1 laser level). If an object is not detected while operating at the mid-level output power, the laser may then be driven at a higher output power level for a short duration (e.g., a class 2 laser level) in order to increase the range of the device to determine if objects are present at a longer distance from the device. Further, if an object is detected while operating at the mid-level output power, the laser may then be driven at a low output power (i.e., lower than the mid-level output power, and still within class 1 limits) in order to increase the accuracy of the distance determination, and further to reduce the power consumed by the device.

While operating in the high output power level mode, the device may limit the duration of the laser output. Accordingly, the laser is operated at the high power mode until either an object is detected (in which case, the laser output is immediately reduced to the mid-level or low power mode), or until the time limit for operation at the high power mode is reached.

In one embodiment, the present disclosure provides a device that includes a laser that operably transmits an optical pulse, e.g., at a mid-level power output. The device includes an optical barrier configured to reflect a first portion of the transmitted optical pulse, and a reference single-photon avalanche diode (SPAD) array configured to receive the first portion of the optical pulse reflected by the optical barrier. A return SPAD array is configured to receive a reflected second portion of the optical pulse (e.g., a portion reflected by an object in an image scene into which the optical pulse is transmitted), and a range detection circuit is coupled to the return SPAD array and the reference SPAD array and is configured to determine a distance to an object based on the reflected first and second portions of the optical pulse. A laser driver circuit is further included in the device that is configured to vary an output power level of the laser, depending on whether an object is detected, and on the determined distance to the object.

In another embodiment, the present disclosure provides a method that includes: driving a laser at a first output power level to transmit an optical pulse into an image scene; determining whether an object is present in the image scene based on whether a reflected portion of the optical pulse is received; and if an object is not present in the image scene, then driving the laser at a second output power level to transmit a second optical pulse into the image scene, the second output power level being higher than the first output power level; if an object is present in the image scene, then driving the laser at a third output power level to transmit a third optical pulse into the image scene, the third output power level being lower than the first output power level.

In yet another embodiment, the present disclosure provides a device that includes a laser, a laser driver coupled to the laser and configured to drive the laser to transmit an optical pulse, an optical sensor array configured to receive a reflected portion of the transmitted optical pulse, a range detection circuit coupled to the optical sensor array and configured to detect the presence of an object and to determine a distance to the object, based on the reflected portion of the optical pulse, and a controller coupled to the range detection circuit and the laser driver, the controller being configured to control the laser driver to drive the laser in one of a low power mode, a high power mode and a mid-power mode, based on the detection of the object and the determined distance to the object.

DETAILED DESCRIPTION

The present disclosure generally provides systems, devices and methods for dynamically changing the output power of a laser utilized in a time of flight (TOF) sensing device, based on whether an object (such as a human) is detected within an image scene, and if so, further based on the determined distance to the detected object.

Figure 1:
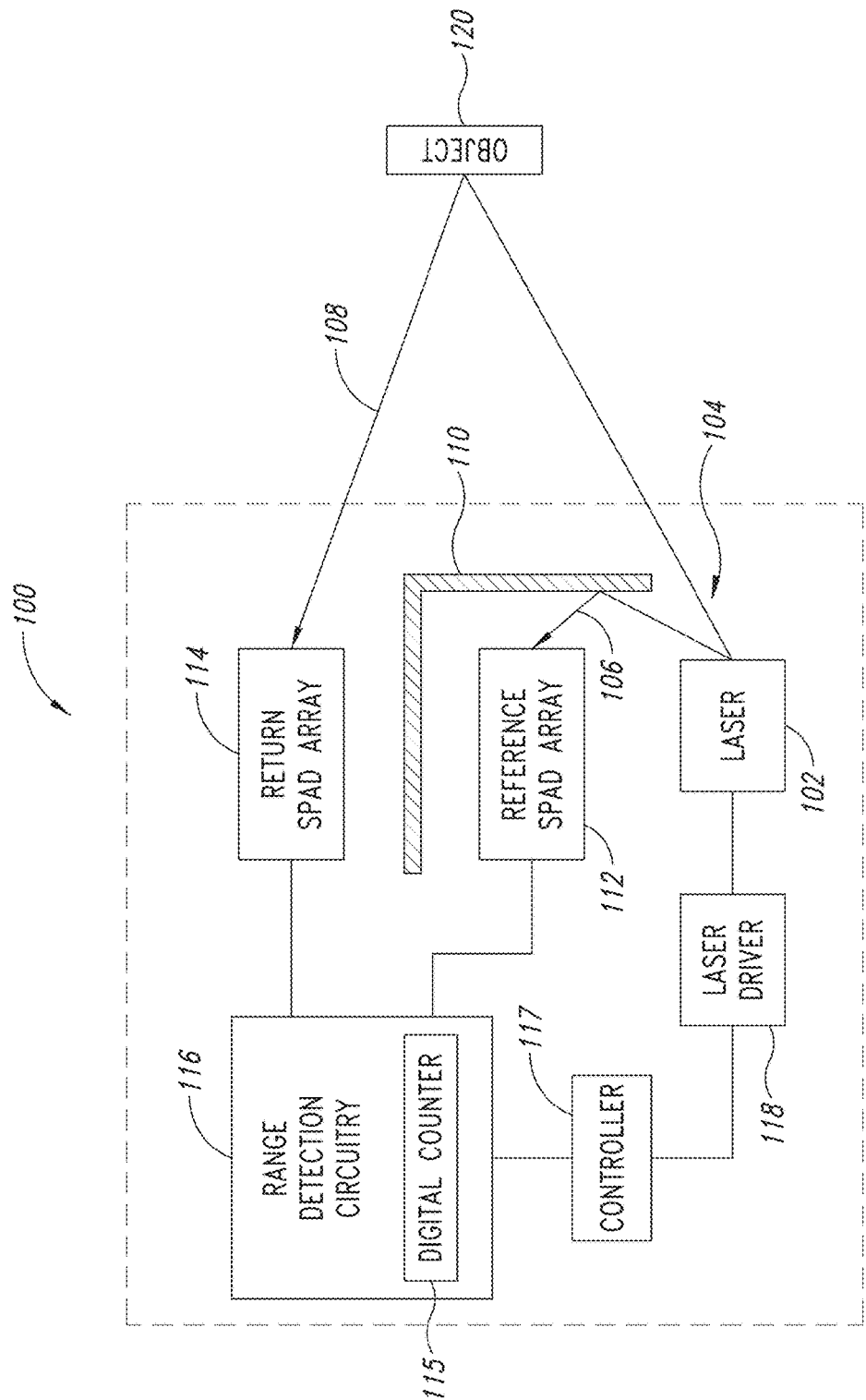
FIG. 1 is a block diagram illustrating an adaptive laser power and ranging limit time of flight (TOF) range detection device, in accordance with one or more embodiments provided herein.

FIG. 1 is a block diagram illustrating an adaptive laser power and ranging limit TOF range detection device 100, in accordance with one or more embodiments. As shown in FIG. 1, the TOF range detection device 100 includes a laser 102 for generating and transmitting an optical pulse 104 into an image scene, which may contain an object 120. In one or more embodiments, the laser 102 is a vertical cavity surface emitting laser (VCSEL).

An optical barrier 110 is included in the TOF range detection device 100, and reflects a first portion 106 of the optical pulse toward a reference single-photon avalanche diode (SPAD) array 112. A second portion 108 of the optical pulse 104 is reflected off of the object 120 in the image scene, and is received at a return SPAD array 114.

The return SPAD array 114 may include, for example, an array of between four and several hundred SPAD cells. As will be appreciated by those skilled in the art, SPAD arrays can be used for a variety of applications, including for ranging, for 2D or 3D gesture recognition and for 3D imaging. Each SPAD cell in the return SPAD array 114 will provide an output pulse or detectable SPAD event when a photon in the form of the reflected second portion 108 of the optical pulse 104 is detected by that cell, and by monitoring these SPAD events an arrival time of the return pulse can be estimated or detected by the range detection circuitry 116.

The reference SPAD array 112 may be, for example, of the same dimensions or of smaller dimensions than the return SPAD array 114, and receives an internal reflection (e.g., reflected by the optical barrier 110) 106 of the transmitted optical pulse 104. In some embodiments, the reference SPAD array 112 is a mono-dimensional array, for example, having only a row or column of SPAD cells.

The range detection circuitry 116 is coupled to the return SPAD array 114 and the reference SPAD array 112 and estimates the distance between the TOF range detection device 100 and the object 120 in the image scene against which the optical pulses reflect. For example, the range detection circuitry 116 may estimate the delay between each transmitted optical pulse 104 and the return optical pulse 108 received by the return SPAD array 114 in order to provide a range estimate in the form of the detected distance to the object 120. The range detection circuitry 116 determines the time of flight based upon the difference between the transmission time of the transmitted optical pulse 104 and the arrival time of the returned optical pulse 108. The range detection circuitry 116 utilizes suitable circuitry, such as time-to-digital converters or time-to-analog converters that generate an output indicative of a time difference that may then be used to determine the time of flight of the transmitted optical pulse 104 and thereby the distance to the object 120, as will be appreciated by those skilled in the art. In one or more embodiments, the range detection circuitry 116 includes a digital counter 115, which counts a number of photons received at the return SPAD array 114 and the reference SPAD array 112 within preset windows or bins of time. Then, by analysis of the photon counts received at the return SPAD array 114 and the reference SPAD array 112, the range detection circuitry 116 may determine a distance to the object.

The TOF range detection device 100 further includes a laser driver 118 that generates a driving signal for driving the laser 102, e.g., by specifying or otherwise controlling an output power of the optical pulse 104 generated by the laser 102. The laser driver 118 is controlled by a controller 117 that is coupled to the range detection circuitry 116 and the laser driver 118. The controller 117 controls the laser driver 118 to operate the laser 102 at an output power level as selected by the controller 117. That is, the controller 117 sets a mode of operation of the laser 102 by setting an output power level to be provided to the laser 102 by the laser driver 118.

The controller 117 controls the output power and maximum range of the laser 102 (e.g., by setting the laser driver 118 in a high power, mid-power or low power mode) based on whether an object 120 is detected in the image scene, and if so, further based on the detected distance between the TOF range detection device 100 and the object 120. To that end, the controller 117 includes or is otherwise coupled to processing circuitry that receives, from the range detection circuitry 116, the estimated or detected distance between the TOF range detection device 100 and the object 120, and that determines an appropriate driving signal to be provided to the laser 102 by the laser driver 118 (e.g., a driving signal which results in a desired output power level or maximum range of the TOF range detection device 100).

Time of flight range or proximity detectors utilizing one or more lasers as a light-emitting device may be classified based on the maximum power and maximum range of the laser. Lasers are generally classified based on accessible emission limits (AEL) into classes ranging from class 1 (no hazard to humans during normal use) to class 4 (severe hazard for eyes and skin). For example, lasers emitting relatively low power beams may be classified as a class 1 laser, which is considered the safest designation among laser devices. A class 2 laser may have a higher output power than a class 1 laser, but may still be considered safe to the human eye if the duration of the output laser is sufficiently short, e.g., less than about 0.25 seconds.

Figure 2:
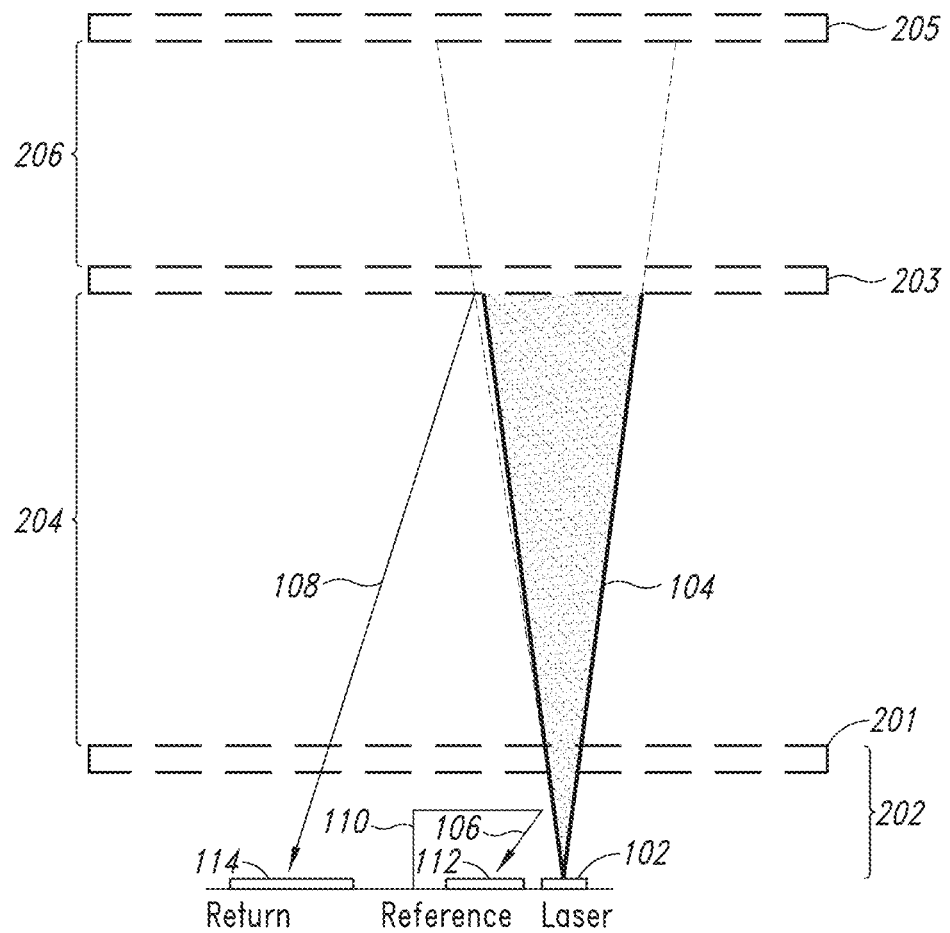
FIG. 2 is a diagram schematically illustrating laser operation in low-level, mid-level and high-level modes of operation, in accordance with one or more embodiments.

In one or more embodiments, the controller 117 is configured to initially set the TOF range detection device 100 in a mid-level output power mode. Referring to FIG. 2, in the mid-level output power mode, the laser 102 output may have a mid-level maximum range (shown generally at 203) that is associated with a mid-level maximum output power. Thus, in the mid-level output power mode, the laser 102 operates at a mid-level range 204 that is between a high-level range 206 and a low-power range 202. Accordingly, in the mid-level output power mode, the controller 117 causes the laser driver 118 to initially drive the laser 102 at a mid-level output power. In one or more embodiments, the mid-level output power level is an output power and/or maximum range that are within the limits prescribed for a class 1 laser. In one or more embodiments, the maximum range or distance when operating in the mid-level output power mode is 2 meters.

If no object 120 is detected at the mid-level output power level (i.e., if the return SPAD array 114 does not receive a return optical pulse 108), the controller 117 controls the laser driver 118 to increase the output power of the laser 102 to a higher output power level. That is, the controller 117 sets the operation of the TOF range detection device 100 in a high-level output power mode. In the high-level output power mode, the laser 102 output may have a high-level maximum range (shown generally at 205) that is associated with a high-level maximum output power. Thus, in the high-level output power mode, the laser 102 operates at a high-level range 206 that is greater than the mid-level range 204.

In the high-level output power mode, the controller 117 causes the laser driver 118 to drive the laser 102 to operate at the high-level output power, which may be an output power and/or maximum range that are within limits prescribed for a class 2 laser. In one or more embodiments, the maximum range or distance when operating in the high-level output power mode is 5 meters. Additionally, in the high-level output power mode, the controller 117 may control the laser driver 118 such that the laser 102 operates at the high-level output power for only a limited duration. For example, the laser 102 may be limited to operating at the high-level output power for a short period of time (e.g., less than about 0.25 seconds).

By increasing the output power of the laser 102 to a class 2 level, the TOF range detection device 100 has an increased ranging limit and thus may detect objects (such as a human) that are nearby, but too far out of range to be detected by the TOF range detection device 100 while operating in the mid-level or low-level output power mode. If an object (such as a human) is detected while operating in the higher output power mode (e.g., when operating as a class 2 laser), the range detection circuitry 116 will report that an object is detected, determine the distance to the object (which detection and distance may be based on a number of photons counted by the digital counter 115 within a particular period of time), and the TOF range detection device 100 will immediately return to the mid-level output power level (i.e., within class 1 laser output power limitations). If, on the other hand, no object is detected while operating in the high-level output power mode, the TOF range detection device 100 will report that no object is detected (or will report the range as being infinite, i.e., no return optical pulse 108 is received), and the TOF range detection device 100 will return to the mid-level output power level.

In one or more embodiments, the controller 117 controls the laser driver 118 such that the laser 102 operates at the high-level output power for no more than a predetermined threshold amount of time. That is, when the TOF range detection device 100 is put into the high-level output power mode (e.g., in response to no object being detected in the mid-level output power mode), the laser 102 outputs an optical burst only until an object 120 is detected (in which case, the laser 102 is immediately returned to the mid-level output power mode), or until the predetermined threshold amount of time has expired. In one or more embodiments, the predetermined threshold may be less than about 0.25 seconds, and in other embodiments, the threshold may be set to about 30 milliseconds.

Additionally or alternatively, in one or more embodiments, the controller 117 may immediately turn off the laser 102 based on a number of reflected photons received by the return SPAD array 114, regardless of whether the TOF ranging device 100 is operating in the low-level, mid-level or high-level output power mode. A threshold number of photons being received (e.g., by the return SPAD array 114) within a predetermined amount of time may be pre-set and the controller 117 will immediately shut off an output of the laser 102 (e.g., by shutting off the laser driver 118) if the number of received photons within the predetermined amount of time exceeds the threshold.

Receiving an excess number of photons within a very short time limit, for example, may indicate that an object is very near or even in contact with the device 100. In such a case, it may be desirable to immediately turn off the output of the laser 102, for example, for safety or other reasons.

If an object (such as a human) is detected while the TOF range detection device 100 is operating in the initial, mid-level output power mode, the controller 117 may cause the laser driver 118 to decrease the output power of the laser 102 to a lower output power level, depending on the determined distance to the object. That is, the controller 117 sets the operation of the TOF range detection device 100 to a low-level output power mode, based on the detected distance to the object. In the low-level output power mode, the laser 102 output may have a low-level maximum range (shown generally at 201) that is associated with a low-level maximum output power. Thus, in the low-level output power mode, the laser 102 operates at a low-level range 202 that is less than the mid-level range 204.

The low output power level may be, for example, an output power and/or maximum range that are within the limitations for a class 1 laser. The maximum range or distance when operating in the low-level output power mode may be any distance less than the maximum range or distance at the mid-level output power mode (e.g., less than about 2 meters, in some embodiments). In one or more embodiments, the maximum range in the low-level output power mode may be less than about 50 millimeters, and in other embodiments may be less than about 15 millimeters.

Figure 3:
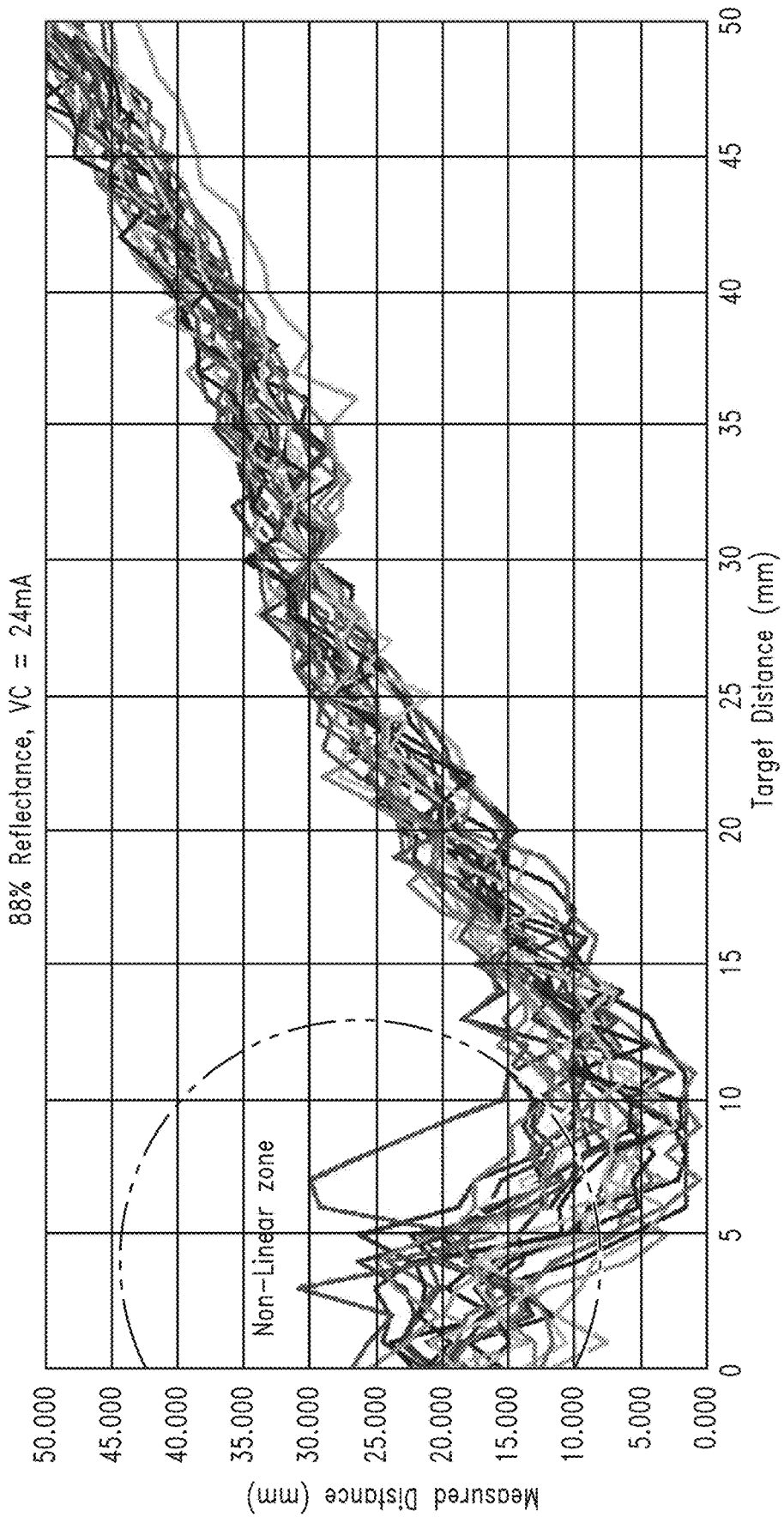
FIG. 3 is a plot showing the target distance and measured distance resulting from several experiments while operating the TOF range detection device in a mid-level output power mode, in accordance with one or more embodiments.

FIG. 3 is a plot showing the target distance and measured distance resulting from several experiments utilizing the TOF range detection device 100 while operating in the mid-level output power mode described herein, with the laser driver 118 providing a driving current of 24 mA to the laser 102. As can be seen from FIG. 3, the measured distance (y-axis) generally corresponds with the actual target distance from a range of about 15 mm to 50 mm and beyond. That is, the experimental values are generally linear (and thus accurate) when the distance to the target object is greater than about 15 mm. However, when the distance to the target object is below about 15 mm, the measured distance varies from the target distance considerably, and the results become non-linear, as shown in FIG. 3. In the near range, the limited power envelope leads to non-linear ranging because the number of received (i.e., reflected) photons within a particular amount of time is very high. If the return SPAD array 114 receives too many photons, it may become saturated, in which case all of the received photons may not be properly counted (e.g., by the digital counter 115), which may lead to a longer determined range due to the missed photons. Thus, the measured distance is not particularly accurate when the target object is at a very close range (i.e., less than about 15 mm).

Figure 4:
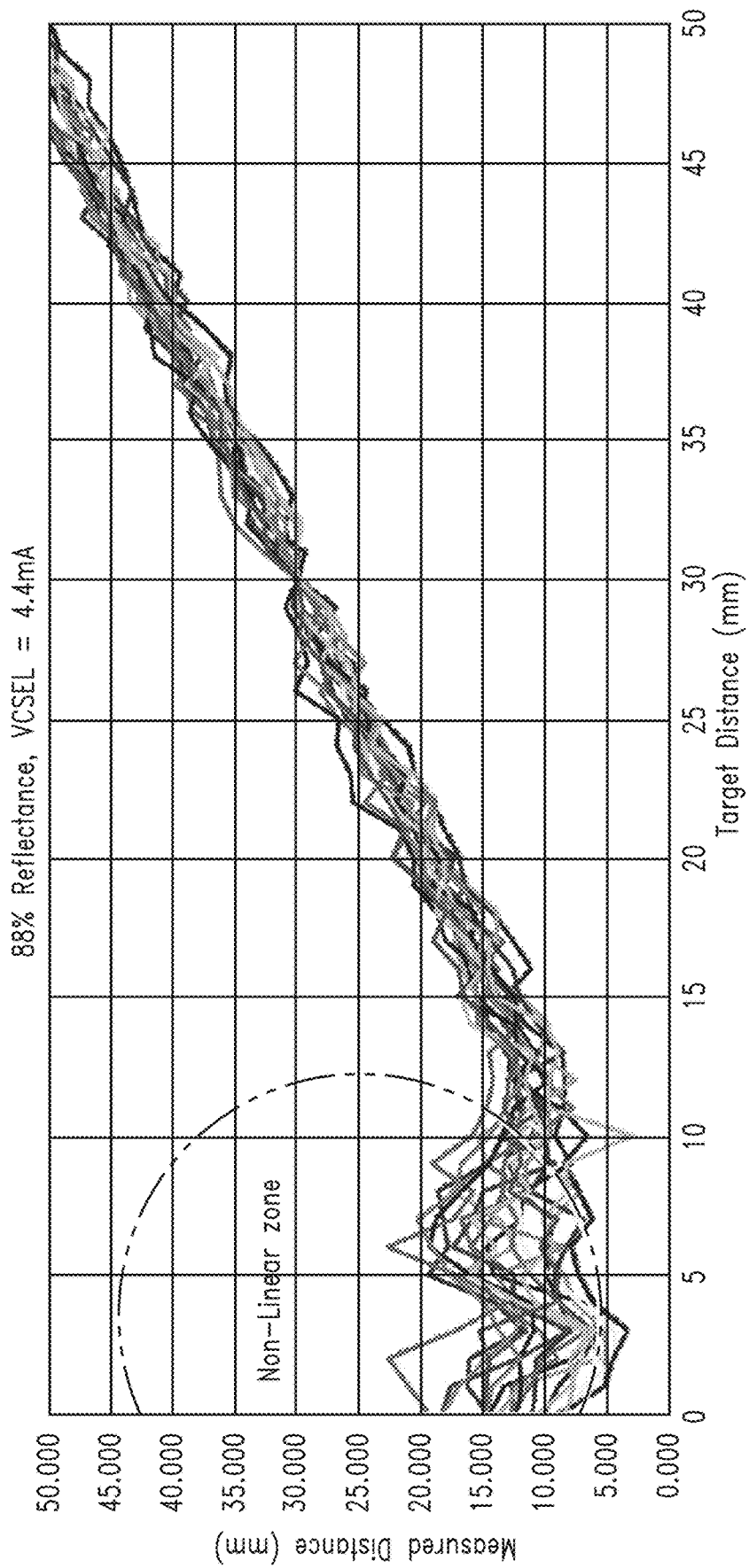
FIG. 4 is a plot showing the target distance and measured distance resulting from several experiments while operating the TOF range detection device in a low output power mode, in accordance with one or more embodiments.

FIG. 4 is a plot showing the target distance and measured distance resulting from several experiments utilizing the TOF range detection device 100 while operating in the low-level output power mode described herein, with the laser driver 118 providing a driving current of 4.4 mA to the laser 102. As can be seen from FIG. 4, the measured distance more accurately matches the actual target distance, particularly so within the non-linear zone (i.e., where the distance to the target object is less than about 15 mm). Thus, in the low-level output power mode, the TOF range detection device 100 may more accurately detect the presence of very nearby objects, and may more accurately detect the distance to such very nearby objects with better linear ranging. The low-level output power mode for the TOF range detection device 100 may therefore be set to have a maximum range or distance that extends beyond the region where ranging results are non-linear while in the mid-level output power mode (e.g., greater than about 15 millimeters).

Thus, in operation, the TOF range detection device 100 initially drives the laser 102 at a mid-level output power (while still within class 1 laser limitations), and may increase to a higher output power for a short duration if no objects (e.g., humans) are detected while operating at the mid-level output power. If an object is detected while operating at the mid-level output power, the TOF range detection device 100 may cause the laser 102 to be driven at a low-level output power, which provides more accurate distance measurements at short ranges, and reduces the power consumed by the TOF range detection device 100.

While the TOF range detection device 100 is described herein as including a laser 102 that can be operated in low-, mid- and high-level output power modes, in one or more alternative embodiments, the TOF range detection device 100 may include two or more distinct lasers, each configured to operate at distinct output levels. For example, the TOF range detection device 100 may include a low-power laser (class 1), a mid-power laser (class 1) and a high-power laser (class 2). Based on the determined distance to a detected object (e.g., as determined by the range detection circuitry 116), the controller 117 may cause the laser driver 118 to drive the appropriate laser, as described herein. For example, the laser driver 118 may drive the mid-power laser initially, and may then, upon the TOF range detection device 100 determining that no object has been detected, drive the high-power laser for a short duration. On the other hand, if an object is detected while operating the mid-power laser, the laser driver 118 may switch off the mid-power laser and then drive the low-power laser in order to more accurately determine the distance to the object.

Switching from the mid-power laser mode to the low-power laser mode may be further based on the actual determined distance to the detected object. For example, if the distance to the object is determined to be greater than 15 mm, the TOF range detection device 100 may, in one or more embodiments, continue to operate in the mid-power mode. On the other hand, if the distance is less than 15 mm, the controller 117 may then cause the laser driver 118 to drive the laser 102 at the low-power level in order to more accurately measure the short distance to the object.

Figure 5:
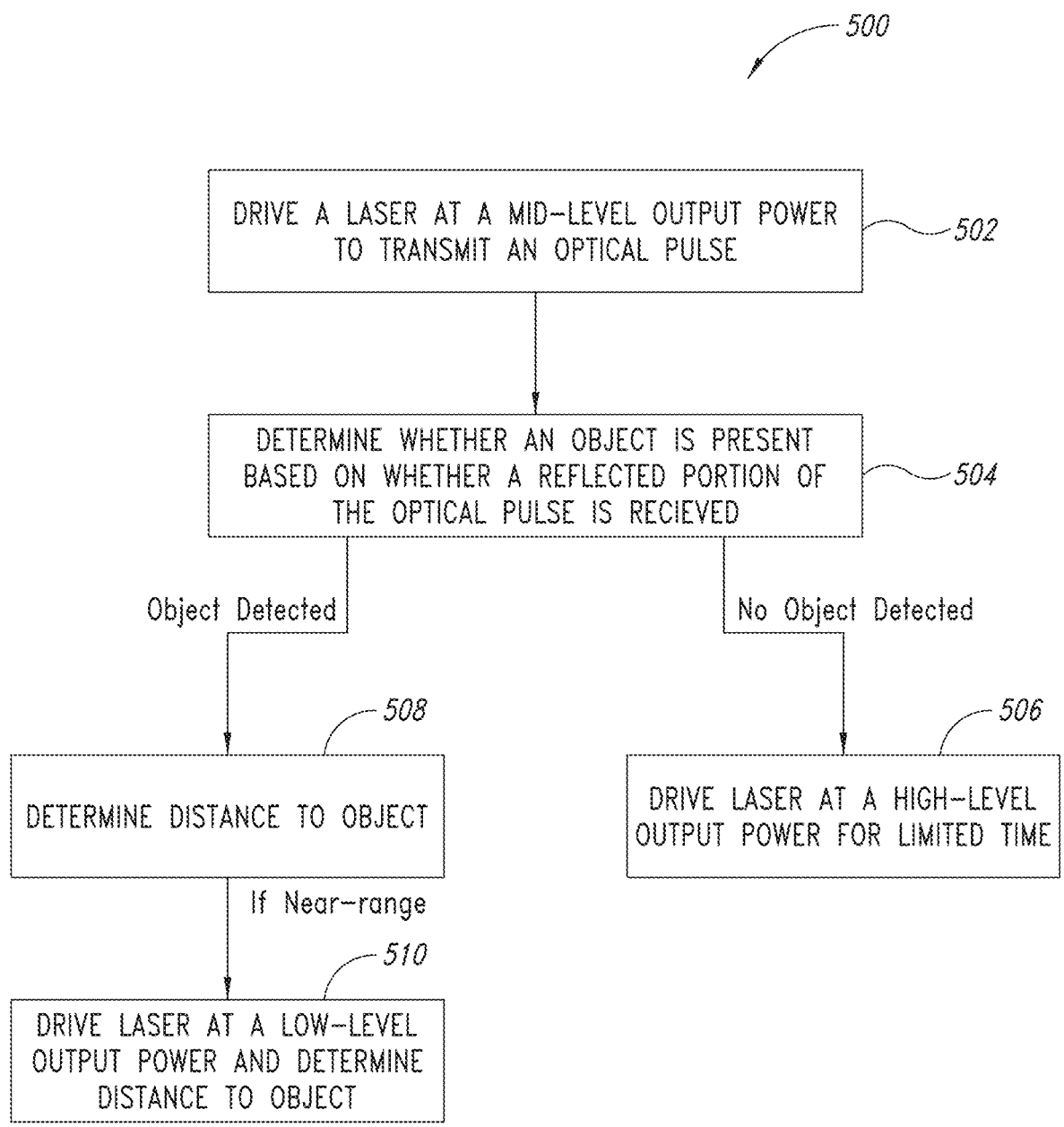
FIG. 5 is a flowchart illustrating a method of operating a time of flight range detection device, in accordance with one or more embodiments.

FIG. 5 is a flowchart 300 illustrating a method of operating a time of flight range detection device, in accordance with one or more embodiments of the present disclosure.

At block 502, the method includes driving a laser 102 at a mid-level output power to transmit an optical pulse 104 into an image scene, in an initial operation of the time of flight range detection device 100. The mid-level output power may have a maximum range (e.g., 2 meters) and a maximum power level that is within the class 1 laser limitations.

At block 504, the method includes determining whether an object 120 is present in the image scene based on whether a reflected portion 108 of the optical pulse 104 is received (e.g., by the return SPAD array 114).

If an object is not present in the image scene, then at block 506 the method includes driving the laser 102 at a high-level output power for a limited time. The laser 102 may be driven at the high-level output power to transmit a high-power optical pulse into the image scene, and the second optical pulse may be limited to a time that is less than 0.25 seconds, and may be less than 30 milliseconds in some embodiments. The high-level output power may have a maximum range (e.g., 5 meters) and a maximum power level that is within class 2 laser limitations. If an object is detected while driving the laser 102 at the high-level output power at block 506, then the distance to the object may be determined and the laser 102 output may subsequently be reduced to the mid-level output power at block 502.

If, on the other hand, an object is determined to be present in the image scene at block 504, then at block 508 the method includes determining a distance to the object. The distance to the object may be determined, for example, by the range detection circuitry 116, based on reflected portions of the optical pulse 104 received by the return SPAD array 114 and the reference SPAD array 112. If the distance to the object is determined, and is further determined to be within the mid-level output power range 204, then the distance to the object may be fully determined and the method may cease or return to the initial operation at block 502.

On the other hand, if the distance to the object is determined to be within the near-range (i.e., within or near the non-linear range when operating at the mid-level output power mode), then a better range or distance determination may be made by operating the laser 102 in the low-level output power mode. Thus, if the distance to the object is determined to be within the near-range (e.g., within about 50 millimeters, in one or more embodiments), then at block 510 the method includes driving the laser 102 at a low-level output power to transmit a low-power optical pulse into the image scene, and determining the distance to the object in the low-level output power mode. The determined distance in the low-level output power mode may be more accurate for near-range objects, as shown in FIG. 4.

As described herein, embodiments of the present disclosure provide several advantages over known ranging devices. For example, by reducing the power of the laser 102 from a mid-level output power to a low-level output power for objects in the near-range, the distance to the object may be determined with better accuracy, and additionally, the power consumption of the time of flight range detection device 100 may be reduced, since the low-level output power mode consumes less power than the mid-level output power mode. Moreover, safety is improved in embodiments, as the laser 102 may be shut off when operating in the high-level output power mode based on whether an object is detected (e.g., based on a threshold number of photons being received within a certain period of time, in which case, the laser 102 may be immediately shut off) or whether a predetermined amount of time for operation in the high-level output power mode has expired.

The various embodiments described above can be combined to provide further embodiments. These and other changes can be made to the embodiments in light of the above-detailed description. For example, in one or more embodiments, the light emitted by the laser 102 may be visible (e.g., wavelengths in the range of 400-700 nm) or non-visible light. In a case where the laser 102 normally emits non-visible light, the time of flight range detection device 100 may include one or more filters in order to pass the light emitted by the laser as light within the visible range. Since class 2 laser limitations or guidelines apply only to visible light lasers, including such a filter may be desirable in embodiments where the laser 102 normally emits non-visible light.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   transmitting a first optical pulse into an image scene by driving a laser at a first output power level, the first optical pulse having a first duration;
   determining whether an object is present in the image scene based on whether a reflected portion of the first optical pulse is received;
   transmitting a second optical pulse into the image scene, in response to determining an object is not present in the image scene, by driving the laser at a second output power level, the second output power level being higher than the first output power level, the second optical pulse having a second duration less than the first optical pulse; and
   transmitting a third optical pulse into the image scene, in response to determining an object is present in the image scene, by driving the laser at a third output power level, the third output power level being lower than the first output power level, wherein the laser has a maximum range of less than 50 millimeters at the third output power level.

2. The method of claim 1, further comprising:
   turning the laser off in response to a number of photons received in the reflected portion of the first optical pulse exceeding a threshold number of photons within a threshold time limit.

3. The method of claim 1 wherein the second duration is less than or equal to a threshold time limit.

4. The method of claim 1, further comprising:
   driving the laser at the first output power level in response to detecting an object while driving the laser at the second output power level.

5. The method of claim 1, further comprising:
   determining a distance to the object in the image scene while driving the laser at the first output power level; and
   driving the laser at the third output power level in response to the determined distance to the object being equal to or less than 15 millimeters.

6. The method of claim 1 wherein the driving the laser at the first output power level includes driving the laser in compliance with class 1 laser standards, and
   wherein the driving the laser at the second output power level includes driving the laser in compliance with class 2 laser standards.

7. The method of claim 1 wherein the laser has a maximum distance of 2 meters at the first output power level.

8. The method of claim 7 wherein the laser has a maximum distance of 5 meters at the second output power level.

9. A method of controlling a time-of-flight (TOF) range detection device having a laser configured to transmit an optical pulse into an image scene, and an optical sensor array configured to receive a reflected portion of the optical pulse, the method comprising:
   driving the laser at a first output power level for a first duration, in an initial mode of operation;
   driving the laser at a second output power level that is higher than the first output power level, in response to the reflected portion of the optical pulse not being received by the optical sensor array in the initial mode of operation, wherein driving the laser at the second output power level includes driving the laser at the second output power level for a second duration shorter than the first duration; and
   driving the laser at a third output power level that is lower than the first output power level, in response to the reflected portion of the optical pulse being received by the optical sensor array in the initial mode of operation, wherein the laser has a maximum range of less than 50 millimeters at the third output power level.

10. The method of claim 9, further comprising:
    turning the laser off in response to a number of photons received in the reflected portion of the optical pulse exceeding a threshold number of photons within a threshold time limit.

11. The method of claim 9 wherein the second duration is less than or equal to a threshold time limit.

12. The method of claim 11 wherein the threshold time limit is less than or equal to 0.25 seconds.

13. The method of claim 9, further comprising:
    driving the laser at the first output power level in response to the reflected portion of the optical pulse being received by the optical sensor array while driving the laser at the second output power level.

14. The method of claim 9, further comprising:
    determining a distance to an object in the image scene while driving the laser at the first output power level; and
    driving the laser at the third output power level in response to the determined distance to the object being equal to or less than 15 millimeters.

15. The method of claim 9 wherein the laser has a maximum distance of 2 meters at the first output power level.

16. The method of claim 15 wherein the laser has a maximum distance of 5 meters at the second output power level.

17. A method, comprising:
    driving, by a laser driver, a laser to transmit an optical pulse;
    receiving, by an optical sensor array, a reflected portion of the transmitted optical pulse;
    detecting, by a range detection circuit coupled to the optical sensor array, a presence of an object and a distance to the object based on the reflected portion of the optical pulse; and
    controlling the laser driver to drive the laser in one of a low power mode, a high power mode and a mid-power mode, based on the detection of the object and the distance to the object,
    wherein the controlling the laser driver includes:
       controlling the laser driver to drive the laser at the mid-power mode in an initial operation for a first duration;
       controlling the laser driver to drive the laser at the high power mode, in response to the object not being detected at the mid-power mode, for a second duration smaller than the first duration; and
       controlling the laser driver to drive the laser at the low power mode, in response to the object being detected in the high power mode, wherein the laser is driven at a lower output level in the low power mode than in the mid-power mode and the high power mode, wherein the laser has a maximum range of less than 50 millimeters at a low output power level.

18. The method of claim 17 further comprising:

counting, by a digital counter, a number of photons received by the optical sensor array within a threshold time limit; and turning off the laser driver in response to the number of photons received by the optical sensor array within the threshold time limit exceeding a threshold number of photons.

19. The method of claim 18 wherein the threshold time limit is less than or equal to 0.25 seconds.

* * * * *